W. HICKOK.

Improvement in Corn-Planters.

No. 131,756.   Patented Oct. 1, 1872.

Witnesses   Inventor:

UNITED STATES PATENT OFFICE.

WILLIAM HICKOK, OF PHARISBURG, OHIO.

IMPROVEMENT IN CORN-PLANTERS.

Specification forming part of Letters Patent No. 131,756, dated October 1, 1872.

*To all whom it may concern:*

Be it known that I, WM. HICKOK, of Pharisburg, Union county, Ohio, have invented certain new and useful Improvements in Hand-Planters, of which the following is a specification:

The nature of my invention consists in the construction of a hand-planter for planting both corn and pumpkin or other seed, which, in dropping the seed into the catch, will cause them to scatter or fall apart from each other instead of depositing them all in a heap, as is now done by all those in use, as will hereafter be more fully set forth.

Figure 1:
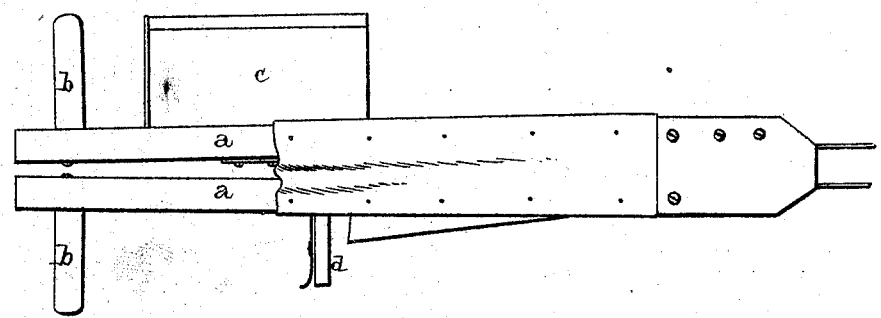
Figure 2:
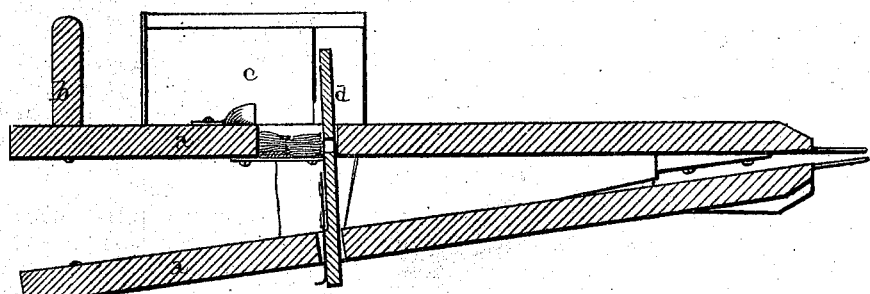
Figure 3:
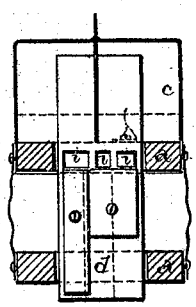

Figure 1 represents a side elevation of my planter; Fig. 2, a vertical section of same; Fig. 3, a plan view of the seed-slide.

My planter is constructed like those now in common use, and consists of the hinged sides $a$, provided with handles $b$, seed-box $c$, and slide $d$. The slide is provided with two, three, or more pockets, $i$, placed side by side, so that as the slide is drawn outward by the movement of the sides the pockets, being full of grain, will drop them so that they will fall a short distance apart.

When but a single pocket is used large enough to hold all the grain, as all those now in use are constructed, the seed all fall in a heap, and in growing smother and interfere with each other to such a degree as to impede their growth; but when made to fall side by side, with a slight distance apart, each one is free to grow without impeding the others, and a marked improvement in the crop is at once discernible.

If desired, channels may be placed in the lower ends of the sides $a$ so as to better insure their falling apart; but this is unnecessary.

Having thus described my invention, I claim as new and desire to secure by Letters Patent—

A hand planter in which the seed-slide is provided with two or more pockets for the purpose of scattering the grain, substantially as set forth.

WILLIAM HICKOK.

Witnesses:
ALLEN HICKOK,
A. W. FRANKLIN.